United States Patent [19]

Vostovich

[11] 4,125,509

[45] Nov. 14, 1978

[54] FLAME AND HEAT RESISTANT ETHYLENE-PROPYLENE RUBBER

[75] Inventor: Joseph E. Vostovich, Bridgeport, Conn.

[73] Assignee: General Electric Company, New York, N.Y.

[21] Appl. No.: 842,695

[22] Filed: Oct. 17, 1977

[51] Int. Cl.$^2$ ............................ C08K 3/22; C08K 3/36
[52] U.S. Cl. .................... 260/33.6 AQ; 174/110 AR; 260/33.6 PQ; 260/42.15; 260/42.33; 260/42.41; 260/42.45; 260/897 C; 428/390
[58] Field of Search ............... 260/42.33, 42.45, 42.41, 260/42.15, 33.6 AQ, 33.6 PQ, 897 C

[56] References Cited

U.S. PATENT DOCUMENTS

| | | | |
|---|---|---|---|
| 3,640,949 | 2/1972 | Dalzell | 260/42.45 |
| 3,730,942 | 5/1973 | Green et al. | 260/42.45 |
| 3,923,731 | 12/1975 | Mackenzie | 260/42.33 |
| 3,956,212 | 5/1976 | Sakaguchi et al. | 260/42.45 |

OTHER PUBLICATIONS

Nordel No. 6, E. I. Du Pont de Nemours and Co. (Inc.), Wil. Del., 1967, pp. 3–11.

*Primary Examiner*—James H. Derrington
*Attorney, Agent, or Firm*—R. G. Simkins; P. L. Schlamp

[57] ABSTRACT

A crosslink curable ethylene-propylene rubber composition with improved resistance to flame and heat, the cured rubber composition and electrical conductors insulated with the cured rubber composition. The improved rubber composition comprises a combination of ethylene-propylene rubber, chlorosulfonated polyethylene, zinc oxide, hydrated alumina and amorphous silica in particular proportions.

8 Claims, 1 Drawing Figure

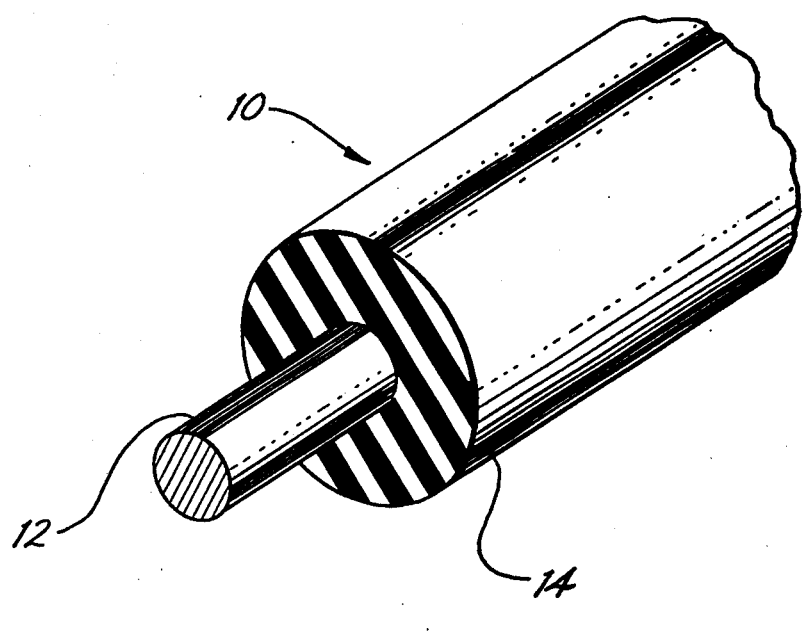

FLAME AND HEAT RESISTANT ETHYLENE-PROPYLENE RUBBER

BACKGROUND OF THE INVENTION

Fire retarding systems or ingredients for use in polymeric compositions and other organic combustible materials have for some years been primarily based upon combinations of halogen-containing compounds, such as chlorinated hydrocarbons, with antimony compounds, such as oxides or halides of antimony, for example, as disclosed in U.S. Pat. No. 2,480,298 of Aug. 30, 1949. However, there remains a need to both improve upon such conventional fire retarding systems, and also to eliminate halogens or compounds thereof and costly antimony compounds from many combustible materials or products without foregoing effective resistance to fire.

Moreover, loss of elasticity, or embrittlement, upon exposure to high temperatures has been a longstanding impediment of many common elastomers. The deteriorating effect of heat upon elastomers has prompted continuing efforts and the use of a variety of remedial measures to improve their resistance to heat, such as the development and use of antioxidants or agents which block the action of oxygen or free radical forming ingredients, and new compound formulations.

The characteristic loss of elasticity or embrittlement of elastomers is a particularly significant and critical problem in the electrical insulating field wherein conductors insulated with heat degradable elastomers are utilized in areas which are exposed to high temperatures, such as leads or wires in or about motors and transformers, or within apparatus containing heating elements or which are otherwise disposed in locations encountering high temperatures.

SUMMARY OF THE INVENTION

This invention comprises a novel rubber composition of a specific combination of compounded ingredients and proportions thereof which has good resistance to flame and to heat, or heat aging, along with satisfactory physical and electrical properties. The flame and heat resistant rubber composition of this invention is composed of an essential combination of ethylene-propylene rubber, chlorosulfonated polyethylene, zinc oxide, hydrated alumina, and amorphous silica in particular proportions, and can include optional components which enhance the overall attributes of the rubber composition. The invention additionally includes electrical conductors insulated with the flame and heat resistant ethylene-propylene rubber compound.

OBJECTS OF THE INVENTION

It is a primary object of this invention to provide a novel rubber composition having increased resistance to flame and high temperatures.

It is a further object of this invention to provide a novel curable rubber composition and products thereof which resist combustion at flame conditions and withstand high temperatures, and which exhibit stable chemical, physical and electrical properties over extended periods of exposure to elevated temperatures.

It is an additional object of this invention to provide a crosslink cured ethylene-propylene rubber composition that is resistant to burning or combustion at flame conditions and to embrittlement and loss of elasticity upon prolonged heating, and possesses physical and electrical attributes which render it advantageously suitable for use as an electrical insulating material for conductors such as wire and cable.

It is also a primary object of this invention to provide a new and improved flame and heat resistant electrical conductor product insulated with a cured elastomer composition having a high level of resistance to burning at flame conditions and a high tolerance to elevated temperature together with apt physical and electrical properties whereby the insulating material substantially maintains its original elastic, flexible and dielectric characteristics through its service life regardless of temperature conditions.

It is a specific object of this invention to provide an ethylene-propylene rubber composition possessing apt electrical properties, abrasion and tear resistance, flexibility and elasticity, and which retains these attributes notwithstanding high temperature conditions, and an improved flame resistant and heat stable electrical insulation thereof.

BRIEF DESCRIPTION OF THE DRAWING

The drawing comprises a perspective view of a section of novel and improved electrical conductor insulated with the rubber composition of this invention.

DETAILED DESCRIPTION OF A PREFERRED EMBODIMENT

This invention specifically involves a novel combination of compounded ingredients and relative proportions thereof which in total produce an elastomeric composition having good resistance to flame or combustion, and stability and resistance to deterioration upon subjection to elevated temperatures over extended periods.

The rubber composition of this invention comprises the combination, in approximate parts by weight, consisting essentially of:

| | |
|---|---|
| Ethylene-propylene rubber | 100 |
| Chlorosulfonated polyethylene | 3 – 10 |
| Zinc oxide | 15 – 30 |
| Hydrated alumina | 35 – 100 |
| Vinyl silane | 1 – 4 |
| Amorphous silica | 35 – 100 |
| Antimony oxide | 2 – 10 |
| Antioxidant | 0.5 – 6 |
| Peroxide curing agent | 2 – 8 |
| Curing coagent | 0 – 3 |

The ethylene-propylene rubber component comprises ethylene-propylene copolymers and terpolymers of typical commercially available compositions constituting about 25 to about 75 parts by weight of ethylene monomer copolymerized with about 75 to about 25 parts by weight of propylene monomer. Terpolymers of ethylene-propylene include those commercial rubbers produced by the copolymerization of ethylene and propylene together with minor proportions of dienes such as ethylidene norbornene, dicyclopentadiene, 1,4-hexadiene, and commercially available as Nordel 1040 EPDM or 1145 EPDM sold by E. I. du Pont.

Hydrated alumina, of course, consists of a well known but distinctive mineral form of hydrated aluminum oxide, which is described in the patent literature, for example, U.S. Pat. Nos. 2,888,424; 2,997,526; 3,189,513; 3,202,567; 3,563,939; and 3,741,929.

The amorphous silica comprises silicas synthetically produced by precipitation, such as the commercial product Silene D, sold by Pittsburgh Plate Glass Company.

Antioxidants for use in the composition of this invention comprise tetrakis[methylene 3-(3',5'-di-tert-butyl-4'-hydroxyphenyl) proprionate] methane (Irganox 1010) and in general the amine, hydroquinoline, or other heterocyclic types. Amine type antioxidants include, for example, di-B-naphthyl-p-phenylenediamine, and hydroquinoline type comprise the polymerized 1,2-dihydro-2,2,4-trimethylquinolines. Other types of heterocyclic antioxidants include, for example, zinc salt of 2-mercaptobenzimidazole.

Peroxide crosslink curing agents for the ethylenepropylene rubber compound of this invention comprise the free radical forming organic peroxides such as tertiary peroxides characterized by at least one unit of the structure

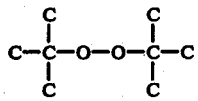

which is activated by its decomposition at temperatures in excess of about 295° F. The use of such peroxides in crosslinking polymers is described in detail in U.S. Pat. Nos. 2,888,424; 3,079,370; and 3,214,422. A commonly used and preferred curing agent for this invention is dicumyl peroxide. Other useful peroxide curing agents include the tertiary diperoxides such as 2,5-dimethyl-2,5 (t-butyl peroxy) hexane, and 2,5-dimethyl-2,5 di (t-butyl peroxy) hexyne-3, mixture of para and meta isomers of α,α'-bis (t-butyl peroxy) diisopropyl benzene (Vul-Cup - R), and the like diperoxy compounds.

The use of a peroxide curing coagent in the crosslinking of the novel composition of this invention is strongly preferred to increase the efficiency of the cure in accordance with the technology in this art. Apt curing coagents include, for example, trimethylol propane trimethacrylate and other esters of metacrylic acid such as ethylene glycol dimethacrylate and 1,3 butyl glycol dimethacrylate. Additional examples of coagents are set forth in an article entitled "Evaluation Of Cross-Linking Coagents In Ethylene-Propylene Rubber" by Lenas, I&EC Product Research & Development, Volume 2, No. 3, September, 1963, pages 202-208.

A processing aid is generally desirably included in the rubber composition of this invention to facilitate preparation and handling of the composition such as the mixing or compounding of its ingredients and/or its forming and consolidation into a product shape by molding or extrusion. Processing aids include oils, waxes and jellies derived from petroleum or hydrocarbon sources, which serve to unite the ingredients into a coherent and uniform workable plastic mass and/or to provide a lubricant therein.

The following comprise examples illustrating specific embodiments of this invention and demonstrating their unique resistance to flame in relation to controls comprising similar compositions.

The compounds of the control and each example of this invention were all prepared in an identical manner, comprising first admixing all components, except the peroxide curing agent and curing coagent, in a Banbury for about 10 minutes while heating to about 250° F. to 300° F. After cooling to room temperature, the curing coagent was added to the admixture in a Banbury followed by the addition of the peroxide and dispersed through the other ingredients.

The compositions of the control and the examples of this invention were as follows in approximate parts by weight:

|  | CONTROL | | | EXAMPLES | | |
| --- | --- | --- | --- | --- | --- | --- |
|  | A | B | C | I | II | III |
| Ethylene-propylene-diene terpolymer (du Pont - Nordel) | 100 | 100 | 100 | 100 | 100 | 100 |
| Chlorosulfonated polyethylene (du Pont - Hypalon) | — | — | 5 | 5 | 5 | 5 |
| Zinc Oxide | 5 | 20 | 20 | 20 | 20 | 20 |
| Talc - hydrated magnesium silicate | 179 | 60 | 60 | — | — | — |
| Hydrated alumina | — | 60 | 60 | 60 | 60 | 60 |
| Vinyl silane | 3 | 1 | 1.7 | 1.7 | 1.7 | 1.7 |
| Amorphous silica | — | — | — | 60 | 60 | 60 |
| Antimony trioxide | — | — | 5 | 5 | 5 | 5 |
| Antioxidants |  |  |  |  |  |  |
| Reaction product of acetone & diphenylamine (Uniroyal - B.L.E. - 25) | 2 | — | — | — | — | — |
| Zinc Salt of 2-mercaptobenzimidazole (Mobay Chemical - Z.M.B.) | — | — | 2 | — | 2 | — |
| Polymerized 1,2-dihydro-2,2,4-trimethylquinoline (R.T. Vanderbilt - Agerite MA) | — | 3 | 2 | 3 | 2 | — |
| Dilaurylthiodiproprionate | — | — | — | — | — | 1. |
| Tetrakis[methylene 3-(3',5'-di-tert-butyl-4'-hydroxyphenyl) proprionate]methane (Ciba-Geigy - Irganox 1010) | — | — | — | — | — | 1. |
| Processing lubricant oil (Sun Oil - Sunpar 2280) | 54 | 20 | 20 | 20 | 20 | 20 |
| Titanium dioxide | — | 1. | 1. | 1. | 1. | 1. |
| Carbon black | 20 | — | — | — | — | — |
| Dicumyl peroxide curing agent (Hercules - Di Cup R) | 4.9 | 3.5 | 3.5 | 3.5 | 3.5 | 3.5 |
| Curing Coagent - trimethylol propane trimethacrylate (Sartomer Resin - SR-350) | 2 | 1 | 1 | 1 | 1 | 1 |

Samples of each composition of the controls and of the examples of this invention were prepared and extrusion molded on copper wire, #18 Awg. in a wall thickness of 3/64 of an inch, then crosslink cured by exposure to steam at a temperature of about 406° F. for about 1.25 minutes.

The flame resistance of the composition of each control and each example of this invention as applied to the wire was determined and evaluated by subjecting samples of each of the composition on wire as set forth to Underwriter's Laboratories Flame Travel Test 758, which measures the rate of flame spread or travel along a horizontally supported insulated wire, and also dripping or discharge of burning particles. The U.L. 758 Travel Test results for samples of each composition of the control and examples of this invention applied as insulation to wire, measured as rate of flame travel between the seven inch mark and the thirteen inch mark in inches per minute and ignition of underlying cotton due to dripping, were as follows:

|  | CONTROL | | | EXAMPLES | | |
| --- | --- | --- | --- | --- | --- | --- |
|  | A | B | C | I | II | III |
| Inches/min. | 0.75 | Flame Out Before 7" | 0.83 | Flame Out Before 7" | 0.87 | 0.93 |
| Dropping Burning Particles or Material | No | Yes | Threw Sparks | No | No | No |

Referring to the drawing, there is shown a typical construction for an insulated electrical wire or cable product 10, comprising a metallic conductive element 12 and an overlying body of cured elastomeric insulation 14 extending thereabout or covering the conductor. In the drawing, the product 10 is illustrated as a short section with the insulation 14 removed from the end portion of the conductor 12. According to one embodiment of this invention, the novel flame and heat resistant ethylene-propylene rubber composition thereof can be used to provide or form the insulation 14 on a conductor 12 of wire or cable product 10. It is to be understood from the foregoing, however, that the insulation can comprise a coating on any portion of a conductive element and that the insulation need not completely enclose the element where such is not necessary for a desired insulative effect.

Although the invention has been described with reference to certain specific embodiments thereof, numerous modifications are possible and it is desired to cover all modifications falling within the spirit and scope of this invention.

What I claim as new and desire to secure by Letters Patent of the United States is:

1. A curable ethylene-propylene rubber composition having improved resistance to flame and heat and having apt electrical and physical properties, consisting essentially of the combination in approximate parts by weight of:

| Ethylene-Propylene Rubber | 100 |
| --- | --- |
| Chlorosulfonated Polyethylene | 3 – 10 |
| Zinc Oxide | 15 – 30 |
| Hydrated Alumina | 35 – 100 |
| Vinyl Silane | 1 – 3 |
| Amorphous Precipitated Silica | 35 – 100 |
| Antimony Oxide | 2 – 10 |
| Antioxidant | 0.5 – 6 |
| Peroxide Curing Agent | 2 – 8 |
| Curing Coagent | 0 – 2 |

2. The crosslink cured product of the ethylene-propylene rubber composition of claim 1.

3. A curable ethylene-propylene rubber composition having improved resistance to flame and heat and having apt electrical and physical properties, consisting essentially of the combination in approximate parts by weight of

| Ethylene-Propylene Rubber | 100 |
| --- | --- |
| Chlorosulfonated Polyethylene | 5 |
| Zinc Oxide | 20 |
| Hydrated Alumina | 60 |
| Vinyl Silane | 2 |
| Amorphous Precipitated Silica | 60 |
| Antimony Trioxide | 5 |
| Antioxidant | 4 |
| Processing Lubricant Oil | 20 |
| Peroxide Curing Agent | 3.5 |
| Curing Coagent | 1.0 |

4. The crosslink cured product of the ethylene-propylene rubber composition of claim 3.

5. A curable ethylene-propylene rubber composition having improved resistance to flame and heat and having apt electrical and physical properties, consisting essentially of the combination in approximate parts by weight of:

| Ethylene-Propylene-Diene Terpolymer | 100 |
| --- | --- |
| Chlorosulfonated Polyethylene | 5 |
| Zinc Oxide | 20 |
| Hydrated Alumina | 60 |
| Vinyl Silane | 1.7 |
| Amorphous Precipitated Silica | 60 |
| Antimony Trioxide | 5 |
| Dilaurylthiodiprioprionate | 1.0 |
| Tetrakis [methylene 3-(3',5'-di-tert butyl-4'-hydroxyphenyl)proprionate] methane | 1.0 |
| Titanium Dioxide | 1.0 |
| Processing Lubricant Oil | 20 |
| Dicumyl Peroxide | 3.5 |
| Trimethylol Propane Trimethacrylate Coagent | 1.0 |
| Processing Lubricant Oil | 20 |
| Dicumyl Peroxide | 3.5 |
| Trimethylol Propane Trimethacrylate Coagent | 1.0 |

6. The crosslink cured product of the ethylene-propylene rubber composition of claim 5.

7. A curable ethylene-propylene rubber composition having improved resistance to flame and heat and having apt electrical and physical properties, consisting essentially of the combination in approximate parts by weight of:

| Ethylene-Propylene-Diene Terpolymer | 100 |
| --- | --- |
| Chlorosulfonated Polyethylene | 3 – 10 |
| Zinc Oxide | 15 – 30 |
| Hydrated Alumina | 35 – 100 |
| Vinyl Silane | 1 – 3 |
| Amorphous Precipitated Silica | 35 – 100 |
| Antimony Trioxide | 2 – 10 |
| Dilaurylthiodiprioprionate | 0.25 – 3 |
| Tetrakis [methylene 3-(3',5'-di-tert-butyl-4'-hydroxyphenyl)proprionate] methane | 0.25 – 3 |
| Titanium Dioxide | 0 – 5 |
| Processing Lubricant Oil | 0 – 50 |
| Dicumyl Peroxide | 2 – 8 |
| Trimethylol Propane Trimethacrylate Coagent | 0 – 3 |

8. The crosslink cured product of the ethylene-propylene rubber composition of claim 7.

* * * * *